(12) United States Patent
Yamaguchi et al.

(10) Patent No.: US 12,536,572 B2
(45) Date of Patent: Jan. 27, 2026

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Kenji Yamaguchi, Miyoshi (JP); Yohei Nakanishi, Nagoya (JP); Yu Hamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 18/535,524

(22) Filed: Dec. 11, 2023

(65) Prior Publication Data

US 2024/0202793 A1   Jun. 20, 2024

(30) Foreign Application Priority Data

Dec. 15, 2022   (JP) ................. 2022-200300

(51) Int. Cl.
  *G06Q 30/00* (2023.01)
  *G06Q 30/0601* (2023.01)
  *G06Q 30/0645* (2023.01)

(52) U.S. Cl.
  CPC ..... *G06Q 30/0621* (2013.01); *G06Q 30/0627* (2013.01); *G06Q 30/0645* (2013.01)

(58) Field of Classification Search
  CPC .................................. G06Q 30/0621
  See application file for complete search history.

(56) References Cited

U.S. PATENT DOCUMENTS

| | | | |
|---|---|---|---|
| 2016/0117743 A1* | 4/2016 | Joshi .............. | G06Q 40/03 705/26.4 |
| 2021/0334870 A1* | 10/2021 | Barone ............. | G06T 19/006 |
| 2022/0105541 A1 | 4/2022 | Naganuma et al. | |

FOREIGN PATENT DOCUMENTS

JP     2022-059901 A    4/2022

OTHER PUBLICATIONS

Ulbrich, Dariusz, et al. "Assessment of selected properties of varnish coating of motor vehicles." Coatings 11.11 (2021): 1320.*

* cited by examiner

*Primary Examiner* — Kathleen Palavecino
(74) *Attorney, Agent, or Firm* — Sughrue Mion, PLLC

(57) ABSTRACT

Disclosed herein is technology that helps to promote the sale and lease of used vehicles. An information processing apparatus provides a first web site that displays information on used vehicles. The information processing apparatus has a controller that receives the specification of a first body color defined as the body color of a used vehicle that a user prefers. When a first vehicle defined as a used vehicle that matches the first body color is not in stock, the controller displays first information to suggest applying an easily removable coating film of the first body color to a second vehicle in stock.

20 Claims, 12 Drawing Sheets

[Fig. 1]
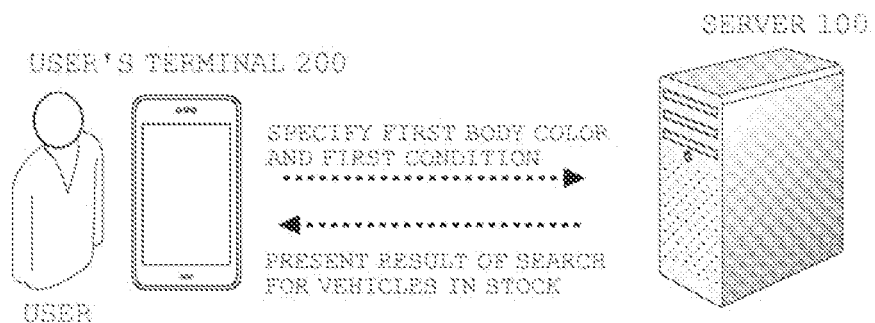

[Fig. 2]
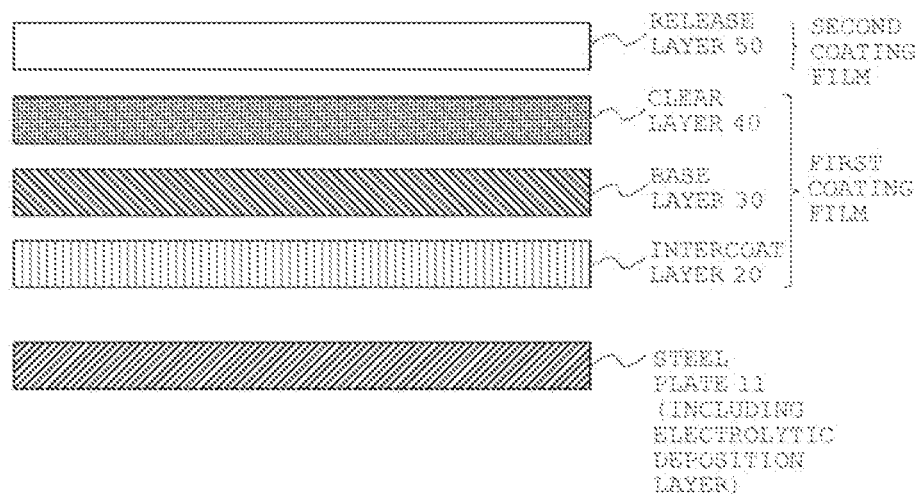
[Fig. 3]
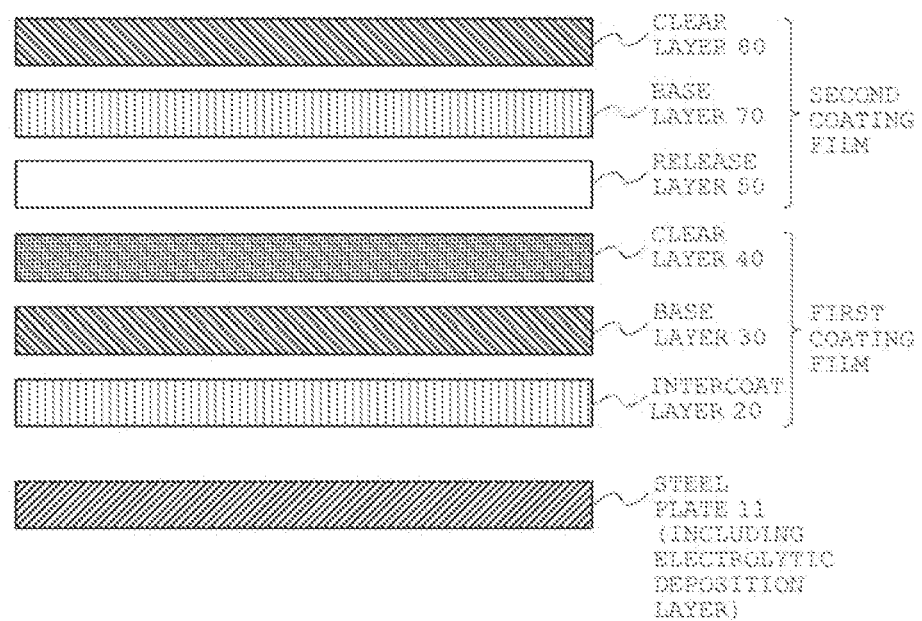

[Fig. 4]
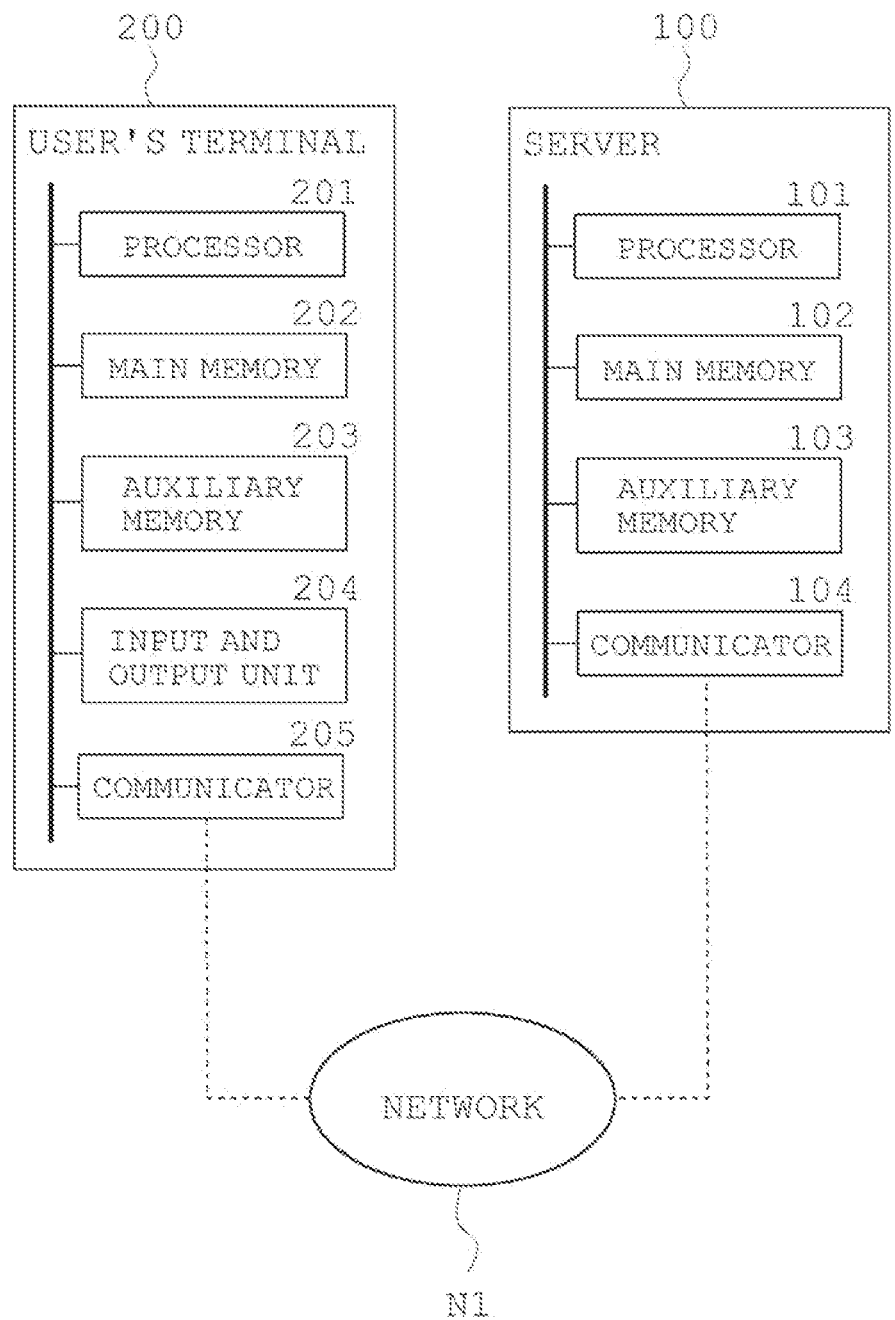

[Fig. 5]
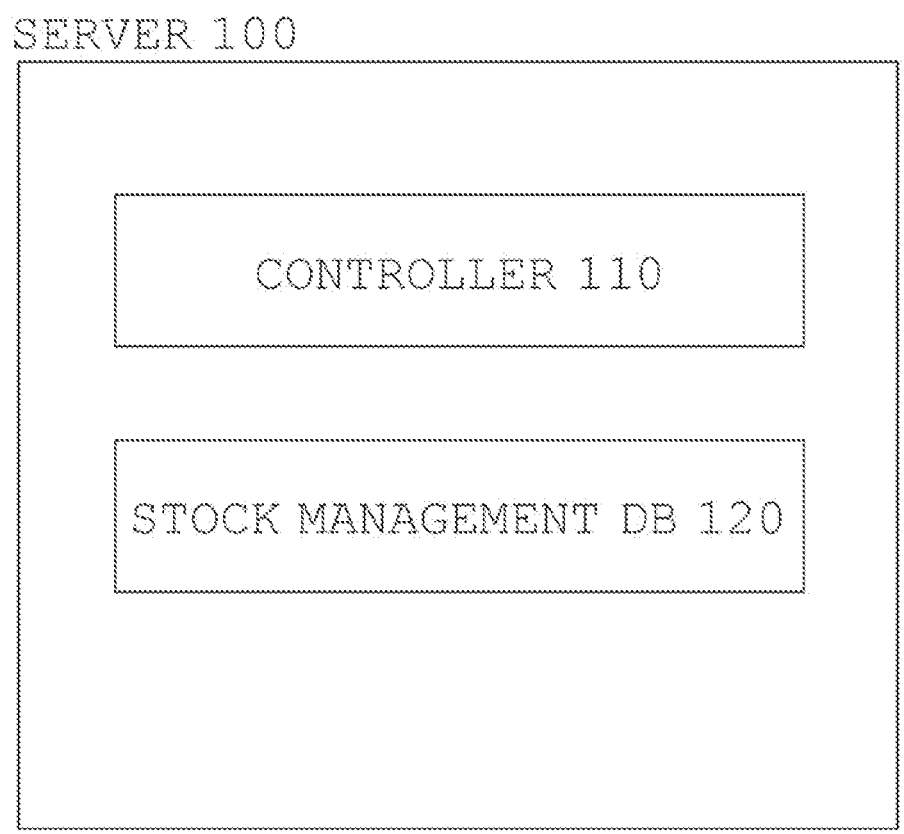

[Fig. 6]
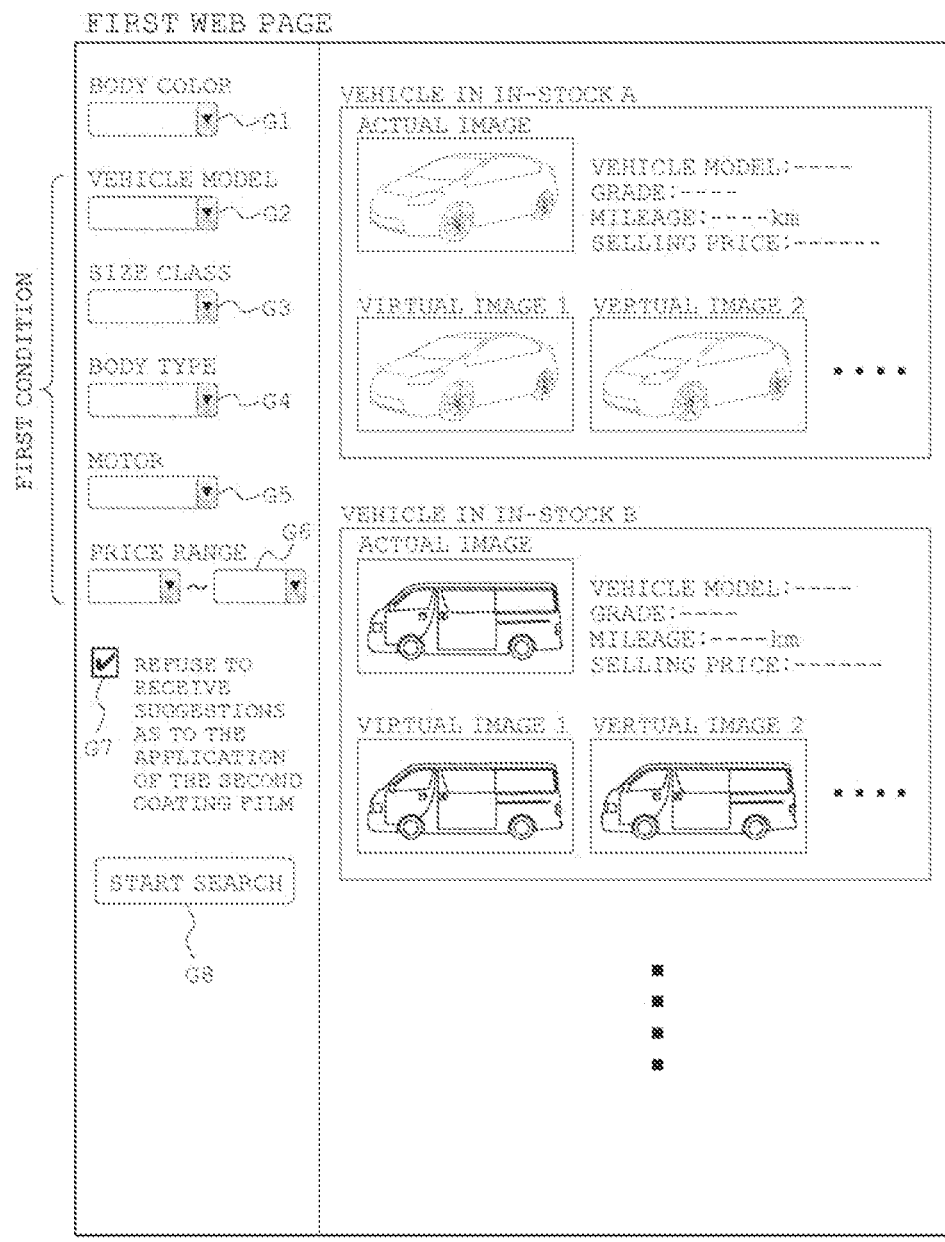

[Fig. 7]
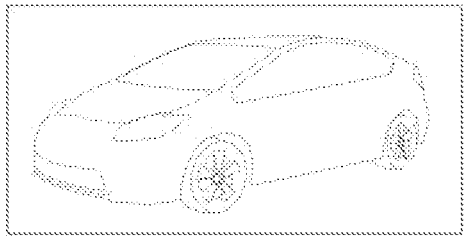

[Fig. 8]
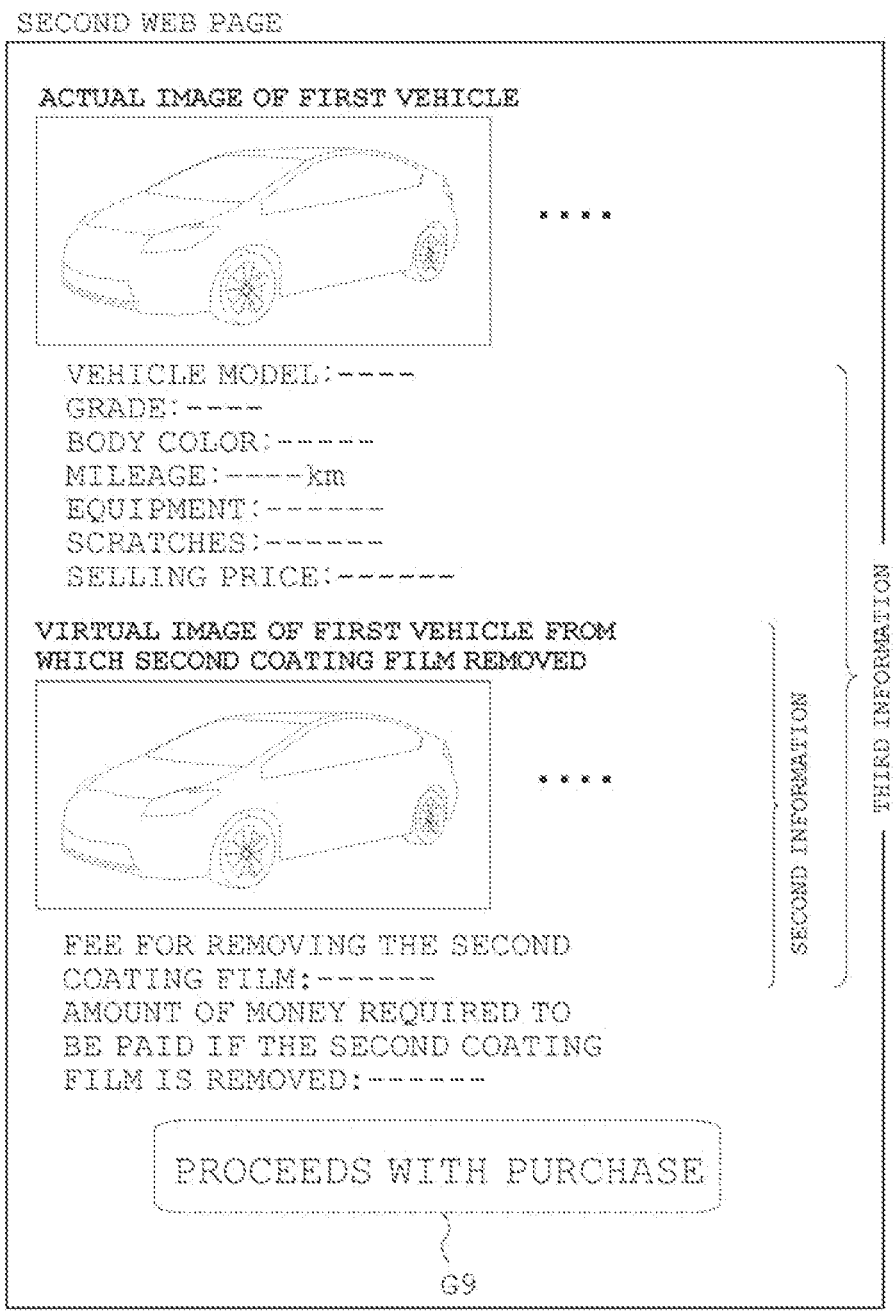

[Fig. 9]

THIRD WEB PAGE

ACTUAL IMAGE OF SECOND VEHICLE

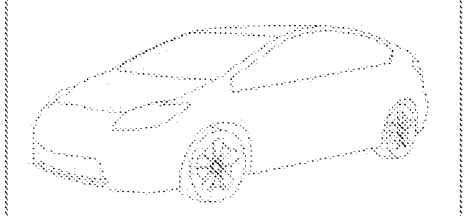

VEHICLE MODEL:----
GRADE:----
BODY COLOR:----
MILEAGE:----km
EQUIPMENT:----
SCRATCHES:----
SELLING PRICE:------
} THIRD INFORMATION

VIRTUAL IMAGE OF SECOND VEHICLE
WITH THE SECOND COATING FILM

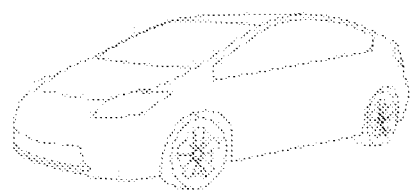

FEE FOR APPLYING THE SECOND
COATING FILM:-----
AMOUNT OF MONEY REQUIRED TO
BE PAID IF THE SECOND COATING
FILM IS APPLIED:------

} FIRST INFORMATION

PROCEEDS WITH PURCHASE

STOCK MANAGEMENT DB 120

| VEHICLE ID | FIRST CONDITION ||||| BODY COLOR | HUE |
|---|---|---|---|---|---|---|---|
| | VEHICLE MODEL | SIZE CLASS | BODY TYPE | MOTOR | PRICE | | |
| V0001 | ----- | ----- | ----- | ----- | ----- | METALLIC GRAY | GRAY |
| V0002 | ----- | ----- | ----- | ----- | ----- | BLUE:80% WHITE:20% | N/A |
| V0003 | ----- | ----- | ----- | ----- | ----- | FIRST COATING FILM: WHITE SECOND COATING FILM: RED | RED |
| ⁂ | ⁂ | ⁂ | ⁂ | ⁂ | ⁂ | ⁂ | ⁂ |

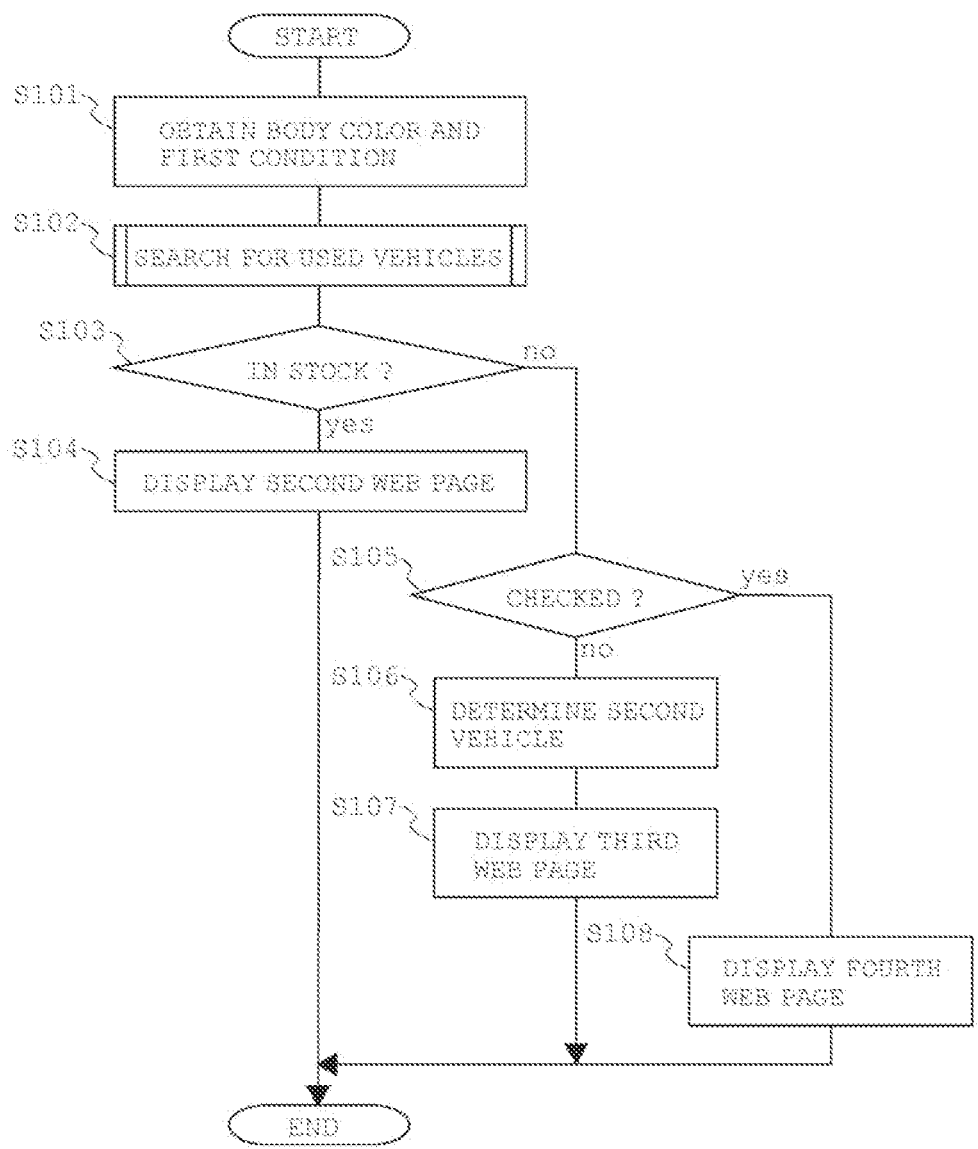
[Fig. 11]

[Fig. 12]
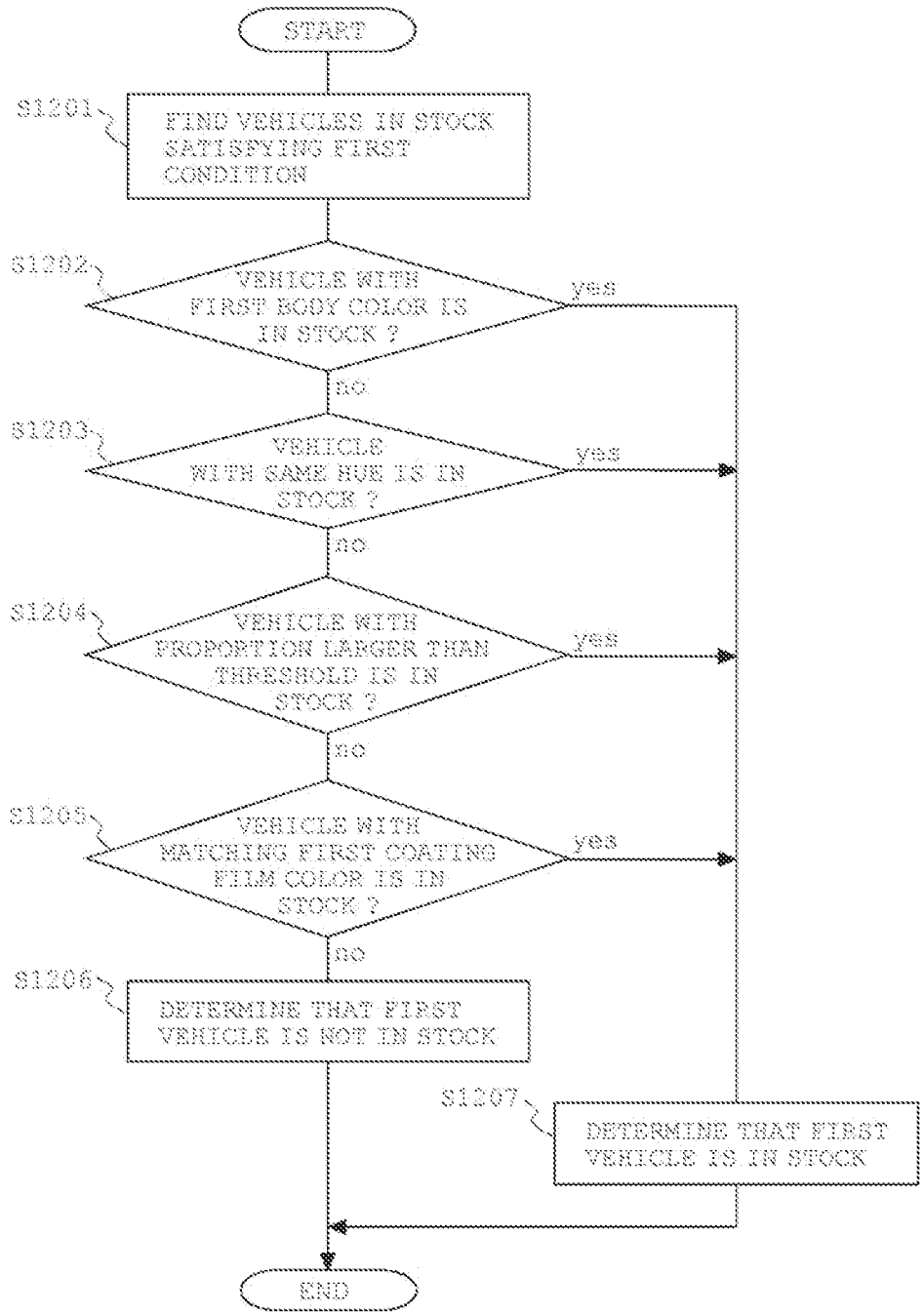

[Fig. 13]
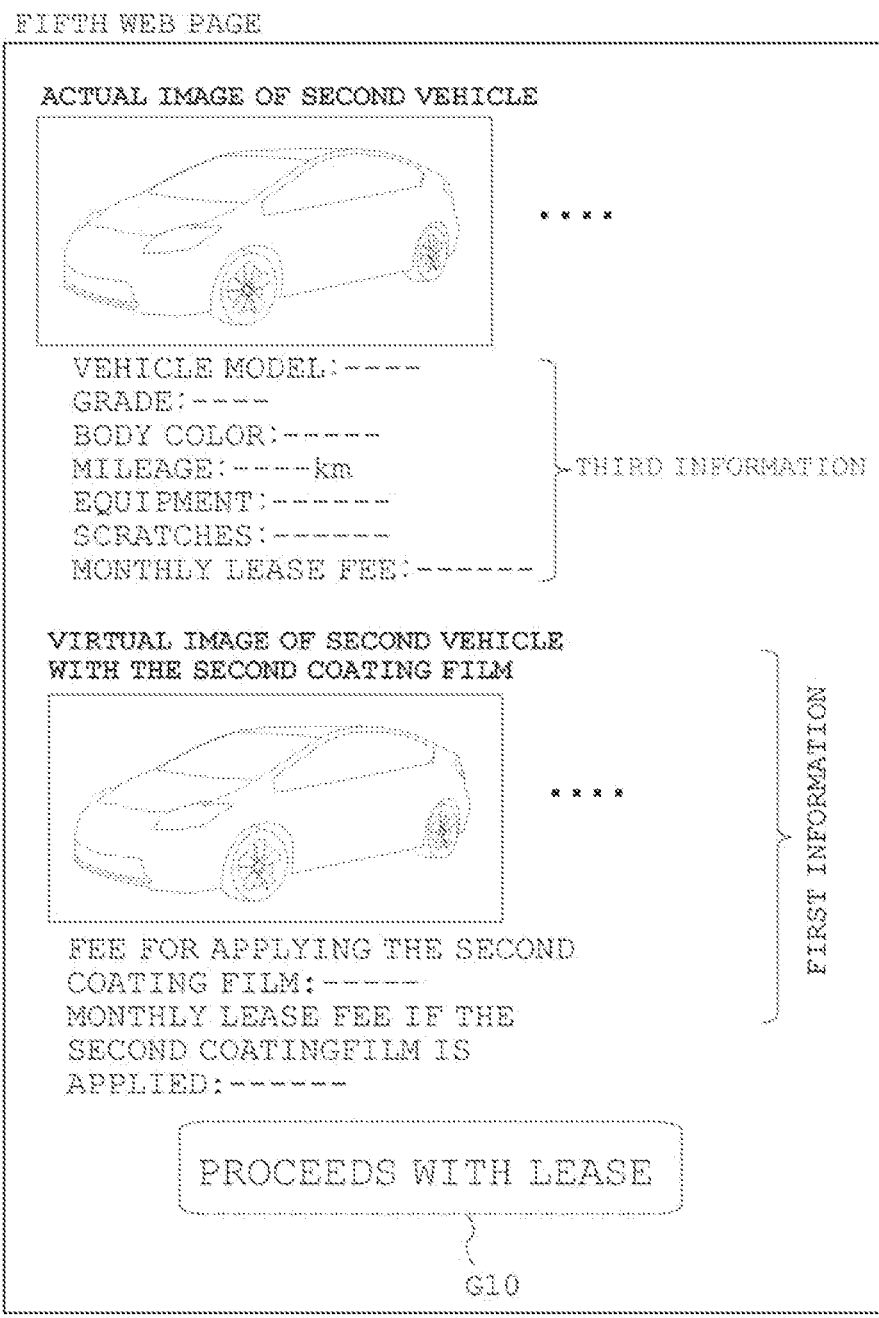

INFORMATION PROCESSING APPARATUS AND INFORMATION PROCESSING METHOD

CROSS REFERENCE TO THE RELATED APPLICATION

This application claims the benefit of Japanese Patent Application No. 2022-200300, filed on Dec. 15, 2022, which is hereby incorporated by reference herein in its entirety.

BACKGROUND

Technical Field

The present disclosure relates to an information processing apparatus and an information processing method.

Description of the Related Art

There is known technology to apply removable coating including an easily removable layer to vehicles (for example, see Patent Literature 1 in the citation list below).

CITATION LIST

Patent Literature

Patent Literature 1: Japanese Patent Application Laid-Open No. 2022-59901

SUMMARY

An object of this disclosure is to provide technology that helps to promote the sale and lease of used vehicles.

In one aspect of the present disclosure, there is provided an information processing apparatus that manages a first web site where a user can search for used vehicles. For example, the information processing apparatus may comprise a controller including at least one processor that is configured to execute the processing of:
  receiving the specification of a first body color as a body color of used vehicles that the user prefers; and
  when a first vehicle defined as a used vehicle with a body color that matches the first body color is not in stock, displaying first information to suggest applying an easily removable coating film of the first body color to a second vehicle in stock on the first web site.

In another aspect of the present disclosure, there is provided an information processing method that is implemented by a computer that manages a first web site where a user can search for used vehicles. For example, the information processing method may comprise the following processing executed by the computer:
  receiving the specification of a first body color as a body color of used vehicles that the user prefers; and
  when a first vehicle defined as a used vehicle with a body color that matches the first body color is not in stock, displaying first information to suggest applying an easily removable coating film of the first body color to a second vehicle in stock on the first web site.

According to other aspects, there are also provided an information processing program configured to cause a computer to implement the above-described information processing method and a non-transitory storage medium in which such an information processing program is stored.

According to the present disclosure, there is provided provide technology that helps to promote the sale and lease of used vehicles.

BRIEF DESCRIPTION OF THE DRAWINGS

FIG. 1 is a diagram illustrating the general configuration of a system according to an embodiment.

FIG. 2 is a diagram illustrating a first exemplary structure of a coating film applied to a vehicle.

FIG. 3 is a diagram illustrating a second exemplary structure of a coating film applied to a vehicle.

FIG. 4 is a diagram illustrating an example of the hardware configurations of a server and a user's terminal included in the system.

FIG. 5 is a block diagram illustrating an exemplary functional configuration of the server.

FIG. 6 illustrates an example of the display on a first web page.

FIG. 7 illustrates a first example of the display on a second web page.

FIG. 8 illustrates a second example of the display on the second web page.

FIG. 9 illustrates an example of the display on a third web page.

FIG. 10 illustrates an example of information stored in a stock management database.

FIG. 11 is a flow chart of a processing routine executed in the server according to the embodiment.

FIG. 12 is a flow chart of a subroutine executed in step S102 in FIG. 11.

FIG. 13 illustrates an example of the display on the third web page according to a modification.

DESCRIPTION OF THE EMBODIMENTS

Vehicles with body colors that were popular at the time when they were sold brand new tend to prevail in the used vehicle market. However, the body colors that are popular in the used vehicle market may be different from the body colors that were popular at the time when the vehicles were sold brand new. There also are needs of users who want to use vehicles with rare body colors. For the above reasons, there are cases where users cannot find vehicles with body colors they prefer among the vehicles a business entity that deals with used vehicles has in stock. Such situations can make the users give up to buy or lease used vehicles. Therefore, some measures should be taken to meet the needs of users who want to use used vehicles with body colors they prefer.

The controller of the information processing apparatus according to the present disclosure is configured to receive the specification of a first body color as a body color of used vehicles that a user prefers. If a used vehicle (first vehicle) that matches the first body color is not in stock, the controller displays first information to suggest applying an easily removable coating film of the first body color to a vehicle in stock (second vehicle) on a first web site.

For example, the information processing apparatus according to the present disclosure is a computer that functions as a web server that provides the first web site through a browser or other application on a terminal used by the user. The information processing apparatus is operated by a business entity that provides the service of selling or leasing used vehicles. For example, the first web site is a web site where a user can search for used vehicles and on which the information on vehicles the business entity has in stock is displayed.

The easily removable layer is applied over the original coating film applied to the vehicle body in the process of manufacturing the vehicle and can be removed later. The original coating film is produced by forming an electrolytic deposition layer (or primer coat) on the surface of the steel plate constituting the vehicle body and laminating an intercoat layer, a base layer, and a clear layer (or topcoat) on the electrolytic deposition layer. The original coating film is not easily removable, because its removal requires the use of a special solution, such as a remover. In contrast, for example, the easily removable coating film incorporates an easily removable layer in the form of a film formed on the original coating film and a coating film (e.g. a film including a base layer and a clear layer) formed on the easily removable layer, and can be easily removed without the use of a special solution. The easily removable coating film itself may be a film that can be removed (i.e. easily removable coating). Such an easily removable coating film can be applied at a cost lower than the cost for replacing the original coating film.

When a vehicle with the first body color the user prefers is not in stock, the information processing apparatus according to the present disclosure can inform the user that it is possible to apply an easily removable coating film of the first body color over the body of a vehicle in stock to change its body color. This can expand the variety of choices available to the user. In consequence, the business entity that deals with used vehicles can respond to the needs of users who want to use used vehicles with body colors they prefer. This can promote the sale or lease of used vehicles.

For example, the first information according to the present disclosure may include information on a condition of the second vehicle, information on a fee for applying the easily removable coating film (first fee), and a virtual image of the second vehicle as it will appear when the easily removable coating film of the first body color is applied to it. In this way, it is possible to inform the user that the easily removable coating film can be applied at a relatively low cost. Moreover, the user can easily image the outer appearance of the second vehicle with the easily removable coating film applied over it.

In the case where the second vehicle is a vehicle for lease, the first information may include information on the monthly fee that incorporates the first fee. Thus, the user can know the monthly lease fee in the case where the easily removable coating film is applied to the second vehicle.

The information processing apparatus according to the present disclosure may have a first database that stores in formation on the body color and information on at least one of the vehicle model, the size class of the vehicle, the type of the vehicle body, the type of the motor, and the price in a linked manner for each of the vehicles in stock. In this case, the controller of the information processing apparatus according to the present disclosure may be configured to receive the specification of a first condition including at least one of the vehicle model, the size class, the body type, the motor type, and the price range of the first vehicle in addition to the specification of the body color of the first vehicle. The controller may be configured to determine whether the first vehicle is in stock based on the first body color, the first condition, and the information stored in the first database. When it is determined that the first vehicle is not in stock, the controller may determine the second vehicle based on the first condition and the information stored in the database.

In this way, the information processing apparatus can present a vehicle in stock that has a body color other than the first body color and matches the first condition to the user as the second vehicle. The vehicle in stock that matches the first condition is not limited to a vehicle that meets all the conditions included in the first condition (e.g. the vehicle model, the size class, the body type, the motor type, and the price range), but it may be a vehicle that meets at least one of the conditions included in the first condition.

The first database may store information on the hue of the body color in addition to the body color and at least one of the vehicle model, the size class of the vehicle, the type of the vehicle body, the type of the motor, and the price in a linked manner for each of the vehicles in stock. In this case, when it is determined that a vehicle that matches the first body color and the first condition is not in stock, the controller may determine whether a vehicle that matches the hue of the first body color and the first condition is in stock based on the information in the first database. When it is determined that a vehicle that matches the hue of the first body color and the first condition is in stock, the controller may determine that the first vehicle is in stock. When it is determined that a vehicle that matches the hue of the first body color and the first condition is not in stock, the controller may determine that the first vehicle is not in stock. In this way, in the case where a vehicle with the first body color is not in stock, the information processing apparatus can present a vehicle in stock that has a body color of the same hue as the first body color to the user as the first vehicle.

The first database may further store information on the proportions of the respective body colors for vehicles in stock that have multiple body colors. Examples of the vehicles in stock that have multiple body colors are vehicles in stock that have two-tone body colors. In this case, when it is determined that a vehicle that matches the first body color and the first condition is not in stock, the controller may determine whether a vehicle of which the proportion of the first body color is larger than a specific threshold and that matches the first condition is in stock based on the information in the first database. For example, the specific threshold may be about 50% to 60% of the entire body. If it is determined that a vehicle of which the proportion of the first body color is larger than the specific threshold and that matches the first condition is in stock, the controller may determine that the first vehicle is in stock. If it is determined that a vehicle of which the proportion of the first body color is larger than a predetermined threshold and that matches the first condition is not in stock, the controller may determine that the first vehicle is not in stock. In this way, in the case where a vehicle with only the first body color is not in stock, the controller can present a vehicle in stock that has multiple body colors including the first body color and matches the first condition and of which the proportion of the first body color is larger than the specific threshold to the user as the first vehicle.

The vehicles in stock that match the first condition can include vehicles in stock of which the color of the original coating film matches the first body color and the color of the easily removable coating film is different from the first body color. The first database may further store information on the color of the original coating and the color of the easily removable coating film for the vehicles that have an easily removable coating film applied thereon among the vehicles in stock. In this case, when it is determined that a vehicle that matches the first body color and the first condition is not in stock, the controller may determine whether there is a vehicle of which the color of the original coating matches the first body color and that matches the first condition among the vehicles in stock that have an easily removable coating film applied thereon. When it is determined that there is a vehicle in stock of which the color of the original coating matches the first body color and that matches the first condition, the controller may determine that a first vehicle is in stock. In this way, in the case where there is no vehicle whose apparent body color matches the first body color in stock, the controller can present a vehicle in stock of which the color of the original coating matches the first body color and that matches the first condition to the user as the first vehicle.

In the case where the controller presents a vehicle in stock of which the color of the original coating matches the first body color and that matches the first condition to the user as the first vehicle, the controller may display second information including information to suggest removing the easily removable coating film from the first vehicle and information on the fee for removing the easily removable coating film on the first web site. Thus, the user can know the fee for removing the easily removable coating film from the first vehicle and the fact that he or she can use a used vehicle with the first body color, if he or she pay this fee. In this case, the second information may include a virtual image of the first vehicle as it will appear when the easily removable coating film is removed from it. This allows the user to image the outer appearance of the first vehicle from which the easily removable coating film has been removed.

The controller of the information processing apparatus according to the present disclosure may display a list of images of vehicles in stock and virtual images of the vehicles in stock as they will appear if multiple colors of easily removable films are applied to them in a first web page of the first web site. For example, the first web page may be the top page of the first web site. In this case, when the user accesses the first web site, he or she can view the list of vehicles in stock and images of the vehicles in stock as they will appear when easily removable coating films are applied to them. The variety of color options for the easily removable coating films is wider than the colors of the original coating film, and images of the vehicles with easily removable coating films may be displayed for only specific colors. For example, these specific colors may be colors that are popular in the market of used vehicles.

Some users may not want to buy or lease used vehicles to which an easily removable coating film is applied. Therefore, when the controller of the information processing apparatus according to the present disclosure receives the specification of the first body color, it may receive user's choice as to whether the user wants the display of the first information (i.e. the suggestion to apply an easily removable coating film of the first body color to the second vehicle). If the controller receives the choice that the user does not want the display of the first information, the controller can disable the display of the first information on the first web site if the first vehicle is not in stock. In this way, the controller can prevent the first information from being displayed to the users who do not want to buy or lease used vehicles to which an easily removable coating film is applied. This can improve the convenience for users who view the first web site.

The information processing apparatus according to the present disclosure may be a server operated by a business entity that provides the service of selling or leasing used vehicles. The server may be a computer that is configured to be capable of implementing a web server that interacts with terminals used by users. In this case, the user can view the first web site provided by the web server by accessing the web server through a browser on the user's terminal. The user can specify the first body color and the first condition and/or choose whether he or she wants the display of the first information. Moreover, the user can receive information on the first vehicle or information on the second vehicle through the browser on the terminal. The server may implement the functions equivalent to the web server described above by executing a service that communicates with a special application program installed in the user's terminal by a specific protocol.

In another aspect, the technology disclosed herein can be identified as an information processing method that is implemented by a computer that executes the processing of the information processing apparatus described above. The information processing method can accomplish the advantageous effects same as the information processing apparatus described above. In still another aspect, the technology disclosed herein can be identified as a program configured to cause a computer to execute the processing of the information processing apparatus described above or a non-transitory storage medium that stores such a program.

In the following, a specific embodiment of the technology disclosed herein will be described with reference to the drawings. It should be understood that hardware configurations, module configurations, and functional configurations that will be described in the following description of the embodiment are not intended to limit the technical scope of the disclosure only to them, unless otherwise stated.

Embodiment

A first embodiment of the technology disclosed herein will be described with reference to FIGS. 1 through 12. In the following description of the embodiment, a case where the information processing apparatus according to the present disclosure is applied to a system that provides the service of selling used vehicles will be described.

(General Configuration of System)

FIG. 1 is a diagram illustrating the general configuration of a system according to the embodiment. The system according to the embodiment includes a server 100 and a user's terminal 200. While FIG. 1 illustrates only one user's terminal 200, the system can include user's terminals 200 as many as the users, when there are multiple users who want to buy vehicles.

The user's terminal 200 is a computer used by a user who wants to buy a used vehicle. The user can access the server 100 through the user's terminal 200 to search for used vehicles in stock. While the following description of the embodiment is directed to a case where the search for used vehicles in stock is assumed to be conducted online, the search may be conducted at a store, for example, a store of a provider of the service of selling used vehicles (used vehicle dealer). In this case, the user's terminal 200 can be a computer installed in the store.

The server 100 is a computer operated by a used vehicle dealer. The server 100 interacts with the user's terminal 200 to search for used vehicles the used vehicle dealer has in stock and presents the result of the search to the user. When the server 100 in the system according to the embodiment searches for used vehicles in stock, it receives the specification of a first body color and a first condition and searches for a used vehicle (first vehicle) that matches the first body color and the first condition among the vehicles in stock. When such a vehicle (first vehicle) is in stock, the server 100 presents information on the first vehicle to the user through the user's terminal 200. This information will also be referred to as the "third information" hereinafter. When the first vehicle is not in stock, the server 100 in the system according to the embodiment chooses a vehicle in stock (second vehicle) based on the first condition. The server 100 presents information (first information) to suggest applying an easily removable coating film of the first body color to the second vehicle selected as above to the user through the user's terminal 200.

(Easily Removable Coating Film)

The coating applied to vehicles will now be described. FIG. 2 is a diagram illustrating the general structure of a coating film applied to a vehicle. As illustrated in FIG. 2, the vehicle has an original coating film (which will also be referred to as the "first coating film" hereinafter) applied to the steel plate 11 that constitutes the body of the vehicle, and an easily removable coating film (which will also be referred to as the "second coating film" hereinafter) is applied over the first coating film. The first coating film includes an intercoat layer 20 formed on the surface of the steel plate 11, a base layer 30 formed on the intercoat layer 20, and a clear layer (or topcoat) 40 formed on the base layer 30. The steel plate 11 is coated with an electrolytic deposition layer as a primer. In the case where the material constituting the body of the first vehicle is a resin, a primer layer may be formed instead of the intercoat layer 20 of the first coating film. The first coating film formed in this way cannot be removed easily, because its removal requires a special solution, such as a remover.

The second coating film includes a release layer 50 formed on the surface of the first coating film (namely, on the surface of the clear layer 40). The release layer 50 is a layer of an easily-removable (or easily releasable) coating material, which can be removed easily by applying force. For example, the release layer 50 is formed by applying an easily-removable coating material over the original coating film by spraying. An example of the easily-removable coating material is coating a material containing xylene, ethylbenzene, antioxidant, methyl ethyl ketone, silica reactant, titanium oxide (in the form of nanoparticles), and an organic solvent. The second coating film may include the release layer 50 and a clear layer formed on the surface of the release layer 50.

The second coating film illustrated in FIG. 2 uses a paint material that is inherently removable or releasable. However, the structure of the second coating film is not limited to that illustrated in FIG. 2, but the second coating film may be any coating film that can be removed easily. For example, as illustrated in FIG. 3, a release layer 60 may be formed on the surface of the clear layer 40 of the first coating film, and a base layer 70 and a clear layer 80 may be formed on the surface of the release layer 60. The release layer 60 illustrated in FIG. 3 is a non-tinted layer made of the same material as the release layer 50 in FIG. 2. In this case, the coating film including the release layer 60, the base layer 70, and the clear layer 80 corresponds to the easily removable coating film according to the present disclosure. The second coating film illustrated in FIG. 3 can be removed easily from the first coating film by applying force to the release layer 60.

By using the second coating film described above, the body color of vehicles can easily be changed to a color different from the color of the first coating film. The cost of applying the second coating film is lower than the cost of replacing the first coating film. Therefore, when the used vehicle dealer does not have a vehicle with the first coating film of the first body color in stock, it is possible to change the body color of a vehicle in stock into the first body color at low cost by applying the second coating film.

When a vehicle with the first body color is not in stock, the server 100 in the system according to the embodiment suggests changing the body color of a vehicle in stock that has a body color different from the first body color to the first body color by applying the second coating film. Thus, it is possible to respond to the needs of users who want to use vehicles with body colors they prefer. This can promote the sale and lease of vehicles in stock.

(System Configuration)

FIG. 4 is a diagram illustrating an example of the respective hardware configurations of the user's terminal 200 and the server 100 included in the system according to this embodiment. The user's terminal 200 will be described first, and the server 100 will be described later.

The user's terminal 200 is a personally-used computer, such as a personal computer, a smartphone, a cellular phone, a tablet computer, or a personal information terminal. The user's terminal 200 has a processor 201, a main memory 202, an auxiliary memory 203, an input and output unit 204, and a communicator 205. The processor 201, the main memory 202, the auxiliary memory 203, the input and output unit 204, and the communicator 205 are interconnected by system buses.

FIG. 4 illustrates only the hardware components that are used to execute the processing related to the use of the service of selling used vehicles among the hardware components of the user's terminal 200. The user's terminal 200 may have hardware components other than those illustrated in FIG. 4 also, examples of which include a hardware component used to determine the present location of the user's terminal 200 and a hardware component for outputting sound.

The processor 201 is an arithmetic processing unit such as a CPU (Central Processing Unit) or a DSP (Digital Signal Processor). The processor 201 loads a program stored in the auxiliary memory 203 into the main memory 202 and executes it to control the user's terminal 200.

The main memory 202 includes a semiconductor memory, such as a RAM (Random Access Memory) and a ROM (Read Only Memory). The main memory 202 provides a storage area and a work area into which programs stored in the auxiliary memory 203 are loaded. The main memory 202 is also used as a buffer for the processing executed by the processor 201.

For example, the auxiliary memory 203 is an EPROM (Erasable Programmable ROM) or an HDD (Hard Disk Drive). The auxiliary memory 203 may include a removable medium or a portable recording medium. Examples of the removable medium include a USB (Universal Serial Bus) memory and a disc recording medium, such as a CD (Compact Disc) or a DVD (Digital Versatile Disc). The auxiliary memory 203 stores various programs and data used by the processor 201 when executing the programs.

The programs stored in the auxiliary memory 203 include an operating system (OS), a browser application program or a special application program for causing the processor 201 to execute the processing related to the use of the service of selling used vehicles.

The input and output unit 204 receives input operations conducted by the user and presents information to the user. The input and output unit 204 according to the embodiment is composed of a touch panel display. The input and output unit 204 includes a touch panel display and a control circuit for it.

The communicator 205 is an interface to connect the user's terminal 200 to a network N1. For example, the network N1 is a WAN (Wide Area Network), which is a global public communication network such as the Internet, or other communication network. The communicator 205 is connected to the network N1 using mobile communications, such as LTE (Long Term Evolution), LTE-Advanced, 5G (5th Generation), or 6G (6th Generation) mobile communications, wireless communications, such as Wi-Fi (registered trademark) or a LAN (Local Area Network). The communicator 205 according to the embodiment communicates with the server 100 through the network N1.

The server 100 is a computer operated by a used vehicle dealer or other business entity. The server 100 has a processor 101, a main memory 102, an auxiliary memory 103, and a communicator 104. The processor 101, the main memory 102, the auxiliary memory 103, and the communicator 104 are interconnected by system buses.

FIG. 4 illustrates only the hardware components that are used to execute the processing related to the service of selling used vehicles among the hardware components of the server 100. The server 100 may include hardware components other than those illustrated in FIG. 4, examples of which include hardware components used to perform operations related a service other than the service of selling used vehicles, a hardware component for receiving input operations conducted by the operator, and a hardware component for presenting information to the operator.

The processor 101, the main memory 102, the auxiliary memory 103, and the communicator 104 of the server 100 are respectively similar to the processor 201, the main memory 202, the auxiliary memory 203, and the communicator 205 of the user's terminal 200 and will not be described in further detail. The programs stored in the auxiliary memory 103 of the server 100 include a program for implementing a web server that interacts with the user's terminal 200 in addition to the operating system. The data stored in the auxiliary memory 103 includes data related to the vehicles that the used vehicle dealer has in stock.

(Functional Configuration of Server)

The server 100 according to the embodiment is configured to be capable of implementing a web server to interact with the user's terminal 200. Specifically, according to the embodiment, the user can access a site (first web site) provided by the web server through the browser on the user's terminal 200 to search for vehicles that the used vehicle dealer has in stock. The server 100 may provide the above-described service by means other than the web server. For example, the server 100 may implement the service of communicating with special application software installed in the user's terminal 200 by a specific protocol.

FIG. 5 is a block diagram illustrating an example of the functional configuration of the server 100 according to the embodiment. As illustrated in FIG. 5, the server 100 has a controller 110 and an stock management database 120 as functional components. The functional components of the server 100 are not limited to the components illustrated in FIG. 5, but some components may be removed, replaced by other components, or added fitly.

The controller 110 is implemented by the processor 101 of the server 100 by loading a program stored in the auxiliary memory 103 into the main memory 102 and executing it. The controller 110 may be implemented partly or entirely by a hardware circuit, such as an ASIC (Application Specific Integrated Circuit) or an FPGA (Field Programmable Gate Array).

The controller 110 implements a web server to interact with the user's terminal 200. According to the embodiment, when the user accesses the web server (i.e. the first web site) through the browser on the user's terminal 200, the controller 110 causes the input and output unit 204 of the user's terminal 200 to display a first web page (or the top page of the first web site) through the browser on the user's terminal 200. FIG. 6 illustrates an example of the display on the first web page.

The example of the first web page illustrated in FIG. 6 includes GUI parts (G1-G7 in FIG. 6) through which the user can enter conditions concerning a used vehicle he or she prefers, a GUI part (G8 in FIG. 6) that serves as a button to start a search ("Start Search" button), and a display area in which a list of vehicles in stock is displayed. The GUI parts through which the user can enter conditions concerning a used vehicle he or she prefers include the following GUI parts G1 through G7.

GUI part G1: a pulldown menu to select the body color
GUI part G2: a pulldown menu to select the vehicle model
GUI part G3: a pulldown menu to select the vehicle size class
GUI part G4: a pulldown menu to select the body type
GUI part G5: a pulldown menu to select the motor type
GUI part G6: a pulldown menu to select the price range (upper and lower limits)
GUI part G7: a checkbox to choose whether or not to want suggestions as to the second coating film (i.e. presentation of the first information)

The "size class" refers to the size of the vehicle body, such as small, medium, or large. Examples of the "body type" include sedan, hatchback, wagon, one box, and SUV. Examples of the "motor type" include gasoline engine, diesel engine, HEV (Hybrid Electric Vehicle), PHEV (Plug-in Hybrid Electric Vehicle), and BEV (Battery Electric Vehicle).

Among the conditions presented in the first web page illustrated in FIG. 6, the conditions other than the body color (namely, the vehicle model, the size class, the body type, the motor type, and the price range) correspond to the first condition according to the present disclosure. In the system according to the embodiment, it is not necessary for the user to make a selection (or specification) as to all of the vehicle model, the vehicle size class, the body type, the motor type, and the price range as the first conditions, but it is sufficient for the user to make a selection (or specification) as to at least one of them. Therefore, the first web page may be configured in such a way that making selection (or specification) as to the body color (G1) and at least one of the first conditions (G2-G6) makes the "Start Search" button (G8) operable. For example, the "Start Search" button (G8) may be grayed out until the selection as to the body color (G1) and at least one of the first conditions (G2-G6) is made. The first conditions are not limited to the examples illustrated in FIG. 6, but it may be changed fitly. For example, the first conditions may include the upper limit of the mileage and/or the equipment of an option (e.g. an advanced driving assistant system).

What is displayed in the display area of the list of vehicles in stock includes actual images of the vehicles in stock, specifications of them (e.g. the vehicle model, the grade, the mileage, and the selling price), and virtual images of them as they will appear if the second coating film is applied to them. The number of color options of the second coating film is relatively large, and it is difficult to display the virtual images for all the color options of the second coating film on the first web page. Therefore, virtual images for preselected colors of the second coating film may be displayed on the first web page. The preselected colors of the second coating film may be determined according to the popularity (or demand) in the market of used vehicles. Alternatively, the preselected colors may be determined based on previous instances of application of colors of the second coating film to vehicles of the same model as each vehicle in stock. For examples, colors of the second coating film that have a large number of previous instances of application may be selected.

When the "Start Search" button (G8) is operated while the body color (G1) and at least one of the first conditions (G2-G6) are selected, the controller 110 determines whether a used vehicle (first vehicle) that matches the selected body color (first body color) and the selected first condition (s) is in stock based on the selected body color, the selected first condition (s), and the information stored in the stock management database 120 described later.

A method of determining whether the first vehicle is in stock will now be specifically described. The controller 110 in the system according to the embodiment firstly determines whether there is a vehicle in stock that has a body color that matches the first body color and meets the first condition (s). When it is determined that there is a vehicle in stock that has a body color that matches the first body color and meets the first condition (s), the controller 110 determines that the first vehicle is in stock.

When it is determined that there is not a vehicle in stock that has a body color that matches the first body color and meets the first condition(s), the controller 110 determines whether there is a vehicle in stock that has a body color similar to the first body color and meets the first condition(s). When it is determined that there is a vehicle in stock that has a body color similar to the first body color and meets the first condition (s), the controller 110 determines that the first vehicle is in stock.

When it is determined that there is not a vehicle in stock that has a body color similar to the first body color and meets the first condition (s), the controller 110 determines whether there is a vehicle in stock of which the proportion of the body color that matches the first body color is larger than a specific threshold and that meets the first condition (s) among the vehicles in stock that have multiple body colors. Examples of the vehicles in stock that have multiple body colors include vehicles in stock that have two-tone body colors and vehicles in stock whose body partly has a multi-colored stripe pattern. For example, the specific threshold is about 50% to 60% of the entire body. When it is determined that there is a vehicle in stock of which the proportion of the body color that matches the first body color is larger than a specific threshold and that meets the first condition(s), the controller 110 determines that the first vehicle is in stock.

When it is determined that there is not a vehicle in stock of which the proportion of the body color that matches the first body color is larger than a specific threshold and that meets the first condition (s), the controller 110 determines whether there is a vehicle in stock of which the color of the first coating film (i.e. the original coating film) matches the first body color and that meets the first condition (s) among the vehicles in stock that have the second coating film applied thereon. When it is determined that there is a vehicle in stock of which the color of the first coating film matches the first body color and that meets the first condition (s), the controller 110 determines that the first vehicle is in stock. When it is determined that there is not a vehicle in stock of which the color of the first coating film matches the first body color and that meets the first condition (s), the controller 110 determines that the first vehicle is not in stock.

In the above method of search, when it is determined that the first vehicle is in stock, the controller 110 causes the input and output unit 204 of the user's terminal 200 to display a second web page that displays third information through the browser of the user's terminal 200. FIG. 7 illustrates an example of the display on the second web page. The example of the second web page illustrated in FIG. 7 includes a display area of an actual image of the first vehicle, a display area of the third information, and a GUI part (G9 in FIG. 7) that serves as a button to proceed with the purchase. For example, the third information includes specifications of the first vehicle (e.g. the vehicle model, the grade, the body color, the mileage, the equipment, the presence/absence of scratches, and the price). In the case where the first vehicle is a vehicle in stock with the second coating film applied thereon of which the color of the first coating film matches the first body color and that meets the first condition (s), the third information may also include a virtual image of the first vehicle as it appears if the second coating film is removed from it and the second information that includes information on the fee for removing the second coating film (e.g. information on the fee for removing the second coating film and the amount of money required to be paid in the case where the second coating film is removed) as illustrated in FIG. 8. The amount of money required to be paid in the case where the second coating film is removed is the selling price of the first vehicle plus the fee for removing the second coating film.

In the above method of search, when it is determined that the first vehicle is not in stock, the controller 110 determines whether the checkbox of "Refuse to receive suggestions as to the second coating film" is checked on the first web page. This checkbox will also be referred to as the "first checkbox" hereinafter. When the first checkbox is not checked, the controller 110 determines (or chooses) a second vehicle based on the first condition (s) selected (or specified) on the first web page and the information stored in the stock management database 120 described later. The second vehicle according to the embodiment is a vehicle in stock that has a body color different from the first body color and satisfies at least one of the conditions included in the first condition specified by the user. When there is a plurality of vehicles that satisfies the first condition (s) in stock, the controller 110 may select the vehicle in stock that satisfies the largest number of first conditions (the vehicle model, the size class, the body type, the motor type, and the price range) as the second vehicle. Alternatively, an order of priority may be set among the first conditions, and the controller 110 may determine the vehicle in stock that satisfies the condition with the highest priority as the second vehicle. For example, the priority order may be set so that the priority decreases from the vehicle model, which has the highest priority, to the price range, to the body type, to the motor type, and to the vehicle size class. The priority order is not limited to this, but it may be set fitly taking account of conditions to which users attached greater importance in previous sales instances and/or the condition of the vehicles in stock.

After determining the second vehicle by the above method, the controller 110 causes the input and output unit 204 of the user's terminal 200 to display a third web page that includes first information through the browser of the user's terminal 200. FIG. 9 illustrates an example of the display on the third web page. The example of the third web page illustrated in FIG. 9 includes a display area of an actual image of the first vehicle, a display area of the third information, a GUI part (G9 in FIG. 9) that serves as a button to proceed with the purchase, and a display area of the first information. For example, the first information includes a virtual image of the second vehicle as it will appear if the second coating film of the first body color is applied to it, the fee (first fee) for applying the second coating film to the second vehicle, and the amount of money required to be paid in the case where the second coating film is applied to the second vehicle (i.e. the selling price of the second vehicle plus the first fee). The first fee includes the cost of material of the second coating film and the labor charge for applying the second coating film to the second vehicle.

In the case where it is determined that the first vehicle is not in stock and the first checkbox is checked on the first web page, the controller 110 causes the input and output unit 204 of the user's terminal 200 to display a fourth web page that illustrates a message indicating that the first vehicle is not in stock.

Referring back to FIG. 5, the stock management database 120 of the server 100 will now be described. The stock management database 120 is a database that stores information related to the vehicles that the used vehicle dealer has in stock. The stock management database 120 is constructed in the auxiliary memory 103 of the server 100 by the processor 101 of the server 100 by executing a DBMS (Database Management System) program. The stock management database 120 may be constructed as a relational database.

FIG. 10 illustrates an example of the information stored in the stock management database 120 according to the embodiment. As illustrated in FIG. 10, the stock management database 120 according to the embodiment has records related to the respective vehicles in stock. This record will also be referred to as the "in-stock vehicle record". As illustrated in FIG. 10, each in-stock vehicle record has the fields of vehicle ID, first condition, body color, and hue. The structure of the in-stock vehicle record is not limited to that illustrated in FIG. 10, but some fields may be added, changed, and/or removed fitly. For example, each in-stock vehicle record has a field to record information related to conditions of each vehicle in stock (e.g. the grade, mileage, equipment, and presence/absence of scratches) in addition to the fields mentioned above.

What is stored in the vehicle ID field is information (vehicle ID) that identifies each of the vehicles in stock. The first condition field has the sub-fields of vehicle model, size class, body type, motor, and price. What is stored in the vehicle model field is information indicating the model of each vehicle in stock. What is stored in the size class field is information indicating the size class of each vehicle in stock. What is stored in the body type field is information indicating the body type of each vehicle in stock. What is stored in the motor field is information indicating the type of the motor each vehicle in stock has. What is stored in the price field is information indicating the selling price of each vehicle in stock.

What is stored in the body color field is information indicating the body color of each vehicle in stock. In the case of vehicles in stock having a single (or monochromatic) body color (an example of which is the vehicle in stock having the vehicle ID of "V0001" in FIG. 10), information that indicates that single body color is stored in the body color field. In the case of the vehicles in stock having multiple body colors (an example of which is the vehicle in stock having the vehicle ID of "V0002" in FIG. 10), information that indicates the multiple colors and information that indicates the proportions of the respective colors are stored in the body color field. In the case of vehicles in stock that have the second coating film applied thereon, information that indicates the color of the first coating film (i.e. the original coating film) and information that indicates the color of the second coating film (i.e. the easily removable coating film) are stored in the body color field.

What is stored in the hue field is information indicating the hue of the body color of each vehicle in stock. In the case of vehicles in stock that have multiple body colors, information is not available in the hue field (N/A). In the case of vehicles in stock that have the second coating film applied thereon, information indicating the hue of the color of the second coating film is stored in the hue field.

The stock management database 120 according to the embodiment corresponds to the "first database" according to the present disclosure.

(Process Executed in Server)

A process executed in the server 100 according to the embodiment will be described with reference to FIGS. 11 and 12. FIG. 11 is a flow chart of a processing routine executed in the server 100, which is triggered by the operation of the "Start Search" button in the first web page. FIG. 12 is a flow chart of a subroutine that is executed in step S102 in the flow chart of FIG. 11. While the processing routines according to the flow charts of FIGS. 11 and 12 are executed by the processor 101 of the server 100, a functional component of the server 100 will be mentioned in the following description as the component that executes the processing in the routine.

When the first web page is displayed on the input and output unit 204 through the browser on the user's terminal 200, and the "Start Search" button (G8) is operated while the body color (G1) and at least one of the first conditions (G2-G6) are selected, the controller 110 of the server 100 obtains the body color selected by the user (first body color) and the first condition (s) selected by the user (step S101). The first body color and the first condition (s) are selected by the user through the pulldown menu (G1) to select the body color and the pulldown menus (G2-G6) to select the first conditions on the first web page, and the selected body color and the selected first condition (s) are transmitted from the user's terminal 200 to the server 100 and obtained by the controller 110. After completing the processing of step S101, the controller F110 executes the processing of step S102.

In step S102, the controller 110 searches for vehicles in stock based on the first body color and the first condition (s) obtained in step S101. The processing executed in step S102 will be described here with reference to FIG. 12.

In the subroutine according to the flow chart of FIG. 12, the controller 110 finds vehicles in stock that satisfy the first condition (s) (step S1201). Specifically, the controller 110 accesses the stock management database 120 using the first condition (s) as arguments. The controller 110 finds in-stock vehicle records in which information that meets the first condition(s) is recorded in the first condition field. In cases where the first condition (s) include a condition that specifies the vehicle model, the controller 110 finds in-stock vehicle records in which information that matches the specified vehicle model is recorded in the vehicle model field. In cases where the first condition (s) include a condition that specifies the size class, the controller 110 finds in-stock vehicle records in which information that matches the specified size class is recorded in the size class field. In cases where the first condition (s) include a condition that specifies the body type, the controller 110 finds in-stock vehicle records in which information that matches the specified body type is recorded in the body type field. In cases where the first condition (s) include a condition that specifies the type of motor, the controller 110 finds in-stock vehicle records in which information that matches the specified type of motor is recorded in the motor field. In cases where the first condition (s) include a condition that specifies the price range, the controller 110 finds in-stock vehicle records in which a selling price that falls within the specified price range is recorded in the price field. In cases where the first condition (s) include conditions that specify two or more among the vehicle model, the size class, the body type, the type of motor, and the price range, the controller 110 finds in-stock vehicle records in which information that satisfies these conditions is recorded in the first condition field. After completing the processing of step S1201, the controller 110 executes the processing of step S1202.

In step S1202, the controller 110 determines whether there is an in-stock vehicle record in which only the body color that matches the first body color is recorded in the body color field among the in-stock vehicle records found in step S1201. In other words, the controller 110 determines whether there is an in-stock vehicle record in which a single body color is recorded in the body color field, and that body color matches the first body color among the in-stock vehicle records found in step S1201. When there is not an in-stock vehicle record in which only the body color that matches the first body color is recorded in the body color field among thein-stock vehicle records found in step S1201 (negative answer to step S1203), the controller 110 executes the processing of step S1203.

In step S1203, the controller 110 determines whether there is an in-stock vehicle record in which the hue same as the hue of the first body color is recorded in the hue field among the in-stock vehicle records found in step S1201. When there is not an in-stock vehicle record in which the hue same as the hue of the first body color is recorded in the hue field among the in-stock vehicle records found in step S1201 (negative answer to step S1203), the controller 110 executes the processing of step S1204.

In step S1204, the controller 110 determines whether there is an in-stock vehicle record of which the proportion of the body color that matches the first body color is larger than a specific threshold among the in-stock vehicle records found in step S1201. Specifically, the controller 110 finds in-stock vehicle records in which a plurality of body colors is recorded in the body color field (an example of which is the in-stock vehicle record with the vehicle ID of "V0002" in FIG. 10) among the in-stock vehicle records found in step S1201. Then, the controller 110 determines whether there is an in-stock vehicle record of which the proportion of the body color that matches the first body color is larger than the specific threshold based on the proportions of the respective body colors recorded in the body color fields of the in-stock vehicle records found as above. When there is not an in-stock vehicle record of which the proportion of the body color that matches the first body color is larger than a specific threshold among the in-stock vehicle records found in step S1201 (negative answer to step S1204), the controller 110 executes the processing of step S1205.

In step S1205, the controller 110 determines whether there is an in-stock vehicle record of which the color of the first coating film (i.e. the original coating film) recorded in the body color field matches the first body color among the in-stock vehicle records found in step S1201. Specifically, the controller 110: finds in-stock vehicle records in which the color of the first coating film and the color of the second coating film are recorded in the body color field (an example of which is the in-stock vehicle record with the vehicle ID of "V0003" in FIG. 10) among the in-stock vehicle records found in step S1201. In other words, the controller 110 finds the in-stock vehicle records for the vehicles in stock that have the second coating film applied thereon among the in-stock vehicle records found in step S1201. Then, the controller 110 determines whether there is an in-stock vehicle record of which the color of the first coating film recorded in the body color field matches the first body color among the in-stock vehicle records found as above. When there is not an in-stock vehicle record of which the color of the first coating film recorded in the body color field matches the first body color among the in-stock vehicle records found in step S1201 (negative answer to step S1205), the controller 110 executes the processing of step S1206.

In step S1206, the controller 110 determines that the first vehicle is not in stock. When step S1202, S1203, S1204 or S1205 is answered in the affirmative, the controller 110 proceeds to step S1207, where it determines that the first vehicle is in stock.

After completing the processing of step S1206 or S1207 in the processing routine according to the flow chart of FIG. 12, the controller 110 executes the processing of step S103 in the processing routine according to the flow chart of FIG. 11.

Referring back to FIG. 11, in step S103, the controller 110 determines whether the first vehicle is in stock. When it has been determined in the processing routine according to the flow chart of FIG. 12 that the first vehicle is in stock (affirmative answer to step S103), the controller 110 executes the processing of step S104.

In step S104, the controller 110 causes the input and output unit 204 of the user's terminal 200 to display the second web page through the browser on the user's terminal 200. The second web page is a web page that illustrates the third information as described above with reference to FIGS. 7 and 8. The third information includes detailed information about the first vehicle (e.g. information on the vehicle model, grade, body color, mileage, equipment, presence/absence of scratches, and selling price). In the case where the first vehicle is a vehicle in stock that has the second coating film applied thereon (namely, a vehicle in stock of which the color of the first coating film matches the first body color and that meets the first condition), the third information includes a virtual image of the first vehicle as it will appear if the second coating film is removed from it and the second information (see FIG. 8). The first vehicle described by the third information is a vehicle that corresponds to any one of the following in-stock vehicle records (1) to (4).

(1) an in-stock vehicle record among the in-stock vehicle records found in step S1201 of the processing routine according to FIG. 12 in which only a body color that matches the first body color is recorded in the body color field (2) an in-stock vehicle record among the in-stock vehicle records found in step S1201 of the processing routine according to FIG. 12 in which the hue same as the hue of the first body color is recorded in the hue field (3) an in-stock vehicle record among the in-stock vehicle records found in step S1201 of the processing routine according to FIG. 12 in which a plurality of body colors is recorded in the body color field and of which the proportion of the body color that matches the first body color is larger than the specific threshold (4) an in-stock vehicle record among the in-stock vehicle records found in step S1201 of the processing routine according to FIG. 12 in which the color of the first coating film and the color of the second coating film are recorded in the body color field and of which the color of the first coating film matches the first body color After completing the processing of step S104, the controller 110 terminates execution of the processing routine according to the flow chart of FIG. 11.

When step S103 is answered in the negative, in other words, when it is determined that the first vehicle is not in stock in the processing routine according the flow chart of FIG. 12, the controller 110 executes the processing of step S105. In step S105, the controller 110 determines whether the first checkbox in the first web page is checked. When the first checkbox is not checked (negative answer to step S105), the controller 110 executes the processing of step S106.

In step S106, the controller 110 determines (or chooses) a second vehicle from among the vehicles that the used vehicle dealer has in stock. The second vehicle is a vehicle among the vehicles that the used vehicle dealer has in stock that satisfies at least one of the conditions included in the first condition. The controller 110 determines the second vehicle based on the information stored in the stock management database 120. Specifically, the controller 110 finds an in-stock vehicle record in which information that satisfies at least one of the conditions included in the first condition is recorded in the first condition field among the in-stock vehicle records stored in the stock management database 120. The controller 110 determines the vehicle in stock that corresponds to the in-stock vehicle record found above as the second vehicle. In cases where there is a plurality of vehicles in stock that satisfies at least one of the conditions included in the first condition, the controller 110 may choose the vehicle that satisfies the largest number of conditions (the vehicle model, the size class, the body type, the motor type, and the price range) included in the first condition as the second vehicle. Alternatively, the controller 110 may set an order of priority among the plurality of conditions included in the first condition and chooses the vehicle in stock that satisfies the condition with the highest priority as the second vehicle. After completing the processing of step S106, the controller 110 executes the processing of step S107.

In step S107, the controller 110 causes the input and output unit 204 of the user's terminal 200 to display the third web page through the browser on the user's terminal 200. The third web page is a web page that illustrates an actual image of the second vehicle, the third information, and the first information as described above with reference to FIG. 9. The first information includes a virtual image of the second vehicle as it will appear if the second coating film of the first body color is applied to it, the fee (first fee) for applying the second coating film to the second vehicle, and the amount of money required to be paid in the case where the second coating film is applied to the second vehicle (i.e. the selling price of the second vehicle plus the first fee).

After completing the processing of step S107, the controller 110 terminates execution of the processing routine according to the flow chart of FIG. 11.

When step S105 is answered in the affirmative, in other words, when the first checkbox is checked, the controller 110 executes the processing of step S108. In step S108, the controller 110 causes the input and output unit 204 of the user's terminal 200 to display the fourth web page through the browser on the user's terminal 200. The fourth web page is a web page that displays a message that states that the first vehicle is not in stock. After completing the processing of step S108, the controller 110 terminates execution of the processing routine according to the flow chart of FIG. 11.

(Operation and Advantageous Effects of Embodiment)

When a used vehicle (first vehicle) with the first body color the user prefer is not found among the vehicles that the used vehicle dealer has in stock, the system according to the embodiment described above can inform the user that it is possible to apply an easily removable coating film (second coating film) to a vehicle in stock (second vehicle) to change its body color at low cost. This can expand the variety of choices available to the user when purchasing a used vehicle. In consequence, it is possible to respond to the needs of user who want to use a used vehicle with the first body color. This can promote the sale of used vehicles.

When the first vehicle with the first body color is not in stock, the system according to the embodiment chooses a vehicle in stock that meets a condition (s) (first condition) the user prefers other than the body color as the second vehicle. In this way, it is possible to respond to the needs of the user other than the body color.

When suggesting the application of the second coating film, the system according to the embodiment can present a virtual image of the second vehicle as it will appear if the second coating film is applied to it. This allows the user to easily image the outer appearance of the second vehicle with the coating film applied over it.

When a vehicle with a body color that matches the first body color that the user prefers is not in stock, the system according to the embodiment can offer a vehicle in stock that has a body color of the same hue as the first body color, a vehicle in stock that has a plurality of body colors and of which the proportion of the body color that matches the first body color is larger than larger than the specific threshold, or a vehicle in stock that has the second coating film applied thereon and of which the color of the original coating film (first coating film) matches the first body color to the user as the first vehicle. This can expand the variety of choices available to the user when purchasing a used vehicle with increased reliability.

According to the embodiment, the user who does not want a used vehicle with the second coating film applied thereon can check the first checkbox in the first web page to refuse to receive suggestions as to the application of the second coating film on the second vehicle. This guarantees the convenience of the user who does not want a used vehicle with the second coating film applied thereon.

According to the embodiment, the top page of the first web site (first web page) provided by the server 100 displays virtual images of vehicles in stock as they will appear if multiple colors of easily removable films are applied to them in addition to actual images of the vehicles in stock. This can motivate the user who views the first web page to search the first web site for used vehicles.

(Modification)

The information processing apparatus according to the present disclosure can also be applied to a system that provides the service of leasing used vehicles. In the case of the system that provides the service of leasing used vehicles, when the first vehicle is not found among the vehicles that the provider of the used vehicle lease service has in stock, the server 100 may display a fifth web page on the first web site instead of the second web page described above.

FIG. 13 illustrates an example of the display on the fifth web page. The example of the fifth web page illustrated in FIG. 13 includes a display area of an actual image of the first vehicle, a display area of the third information, a GUI part (G10 in FIG. 13) that serves as a button to proceed with a lease contract, and a display area of the first information. The third information according to this modification includes information on the monthly lease fee instead of the selling price according to the embodiment described above. The first information according to this modification includes information on the monthly lease fee in the case where the second coating film is applied to the second vehicle instead of the amount of money required to be paid in the case where the second coating film is applied to the second vehicle according to the embodiment described above.

In the case where the second vehicle is a vehicle for lease, the system according to this modification can present the monthly lease fee in the case where the second coating film is not applied to the second vehicle, the fee for applying the second coating film to the second vehicle, and the monthly lease fee in the case where the second coating film is applied to the second vehicle to the user. In consequence, the user can see the difference between the monthly lease fee in the case where the second coating film is not applied to the second vehicle and that in the case where the second coating film is applied to the second vehicle. As a result, it is possible to let the user notice that the easily removable coating film can be applied at relatively low cost.

<Others>

The above embodiment and modification have been described only by way of example. The technology disclosed herein can be implemented in modified manners without departing from the essence of this disclosure. One or some of the processes that have been described as processes performed by one apparatus may be performed by a plurality of apparatuses in a distributed manner. One or some of the processes that have been described as processes performed by different apparatuses may be performed by one apparatus. The hardware configuration used to implement various functions in a computer system may be modified flexibly.

The technology disclosed herein can be implemented by supplying a computer program (information processing program) or programs configured to implement the functions described in the above description of the embodiments to a computer to cause one or more processors of the computer to read out and to execute the program or programs. Such a computer program or programs may be supplied to the computer by a non-transitory, computer-readable storage medium that can be connected to a system bus of the computer or through a network. The non-transitory, computer-readable storage medium is a recording medium that can store information such as data and programs electrically, magnetically, optically, mechanically, or chemically in a computer-readable manner. Examples of such a recording medium include any type of discs including magnetic discs, such as a floppy disc (registered trademark) and a hard disk drive (HDD), and optical discs, such as a CD-ROM, a DVD, and a Blu-ray disc. The non-transitory, computer-readable storage medium may also be a ROM, a RAM, an EPROM, an EEPROM, a magnetic card, a flash memory, an optical card, an SSD (Solid State Drive), or other medium.

What is claimed is:

1. An information processing apparatus that manages a first web site where a user can search for used vehicles, comprising a controller including at least one processor, the controller being configured to execute the processing of:
   receiving the specification of a first body color as a body color of used vehicles that the user prefers; and
   when a first vehicle defined as a used vehicle with a body color that matches the first body color is not in stock, displaying first information to suggest applying an easily removable coating film of the first body color to a second vehicle in stock on the first web site,
   wherein the first information includes a virtual image of the second vehicle as it will appear when the easily removable coating film is applied to it.

2. The information processing apparatus according to claim 1, further comprising a first database that stores information on the body color and information on at least one of the vehicle model, the size class, the body type, the motor type, and the price in a linked manner for each of the vehicles in stock, wherein the controller is configured to execute the processing of:
   receiving the specification of a first condition including at least one of the vehicle model, the size class, the body type, the motor type, and the price of the first vehicle in addition to the specification of the first body color;
   determining whether the first vehicle is in stock based on the first body color, the first condition, and the information in the first database; and
   when it is determined that the first vehicle is not in stock, determining the second vehicle based on the first condition and the information in the first database.

3. The information processing apparatus according to claim 2, wherein the first database stores information on the hue of the body color in addition to the information on the body color and the information on at least one of the vehicle model, the size class, the body type, the motor type, and the price in a linked manner for each of the vehicles in stock, and the controller is configured to execute the following processing when it is determined that there is not a vehicle in stock that matches the first body color and the first condition:
   determining whether there is a vehicle in stock that matches the hue of the first body color and the first condition based on the information in the first database;
   when it is determined that there is a vehicle in stock that matches the hue of the first body color and the first condition, determining that the first vehicle is in stock; and
   when it is determined that there is not a vehicle in stock that matches the hue of the first body color and the first condition, determining that the first vehicle is not in stock.

4. The information processing apparatus according to claim 2, wherein the first database further stores information on the proportions of respective body colors of vehicles in stock that have multiple body colors, and the controller is configured to execute the following processing when it is determined that there is not a vehicle in stock that matches the first body color and the first condition:
   determining whether there is a vehicle in stock of which the proportion of the first body color is larger than a specific threshold and that matches the first condition based on the information in the first database;
   when it is determined that there is a vehicle in stock of which the proportion of the first body color is larger than a specific threshold and that matches the first condition, determining that the first vehicle is in stock; and
   when it is determined that there is not a vehicle in stock of which the proportion of the first body color is larger than a specific threshold and that matches the first condition, determining that the first vehicle is not in stock.

5. The information processing apparatus according to claim 2, wherein the first database further stores information on the color of the original coating and the color of the easily removable coating film for vehicles in stock that have an easily removable coating film applied thereon, and the controller is configured to execute the following processing when it is determined that there is not a vehicle in stock that matches the first body color and the first condition:

determining whether there is a vehicle in stock of which the color of the original coating matches the first body color and that matches the first condition among the vehicles in stock that have an easily removable coating film applied thereon based on the information in the first database;

when it is determined that there is a vehicle in stock of which the color of the original coating matches the first body color and that matches the first condition, determining that the first vehicle is in stock; and when it is determined that there is not a vehicle in stock of which the color of the original coating matches the first body color and that matches the first condition, determining that the first vehicle is not in stock.

6. The information processing apparatus according to claim 5, wherein when it is determined that the first vehicle is in stock, the controller displays second information on the first web site, the second information including:

information to suggest removing the easily removable coating film from the first vehicle, a virtual image of the first vehicle as it will appear when the easily removable coating film is removed from it, and information on a fee for removing the easily removable coating film from the first vehicle.

7. The information processing apparatus according to claim 1, wherein the first information includes information on a condition of the second vehicle and a virtual image of the second vehicle as it will appear if an easily removable coating film is applied to it.

8. The information processing apparatus according to claim 7, wherein the first information further includes information on a first fee for applying the easily removable coating film to the second vehicle.

9. The information processing apparatus according to claim 8, wherein the second vehicle is a vehicle for lease, and the first information includes information on a monthly lease fee incorporating the first fee.

10. The information processing apparatus according to claim 1, wherein the controller displays a list of images of vehicles in stock and virtual images of the vehicles in stock as they will appear if multiple colors of easily removable films are applied to them on a first web page of the first web site.

11. The information processing apparatus according to claim 1, wherein the controller receives user's choice as to whether the user wants display of the first information or not in addition to the specification of the first body color, and in the case where the controller receives the choice that the user does not want display of the first information, the controller does not display the first information on the first web site, when the first vehicle is not in stock.

12. An information processing method implemented by a computer that manages a first web site where a user can search for used vehicles, comprising the following processing executed by the computer:

receiving the specification of a first body color as a body color of used vehicles that the user prefers; and when a first vehicle defined as a used vehicle with a body color that matches the first body color is not in stock, displaying first information to suggest applying an easily removable coating film of the first body color to a second vehicle in stock on the first web site, wherein the first information includes a virtual image of the second vehicle as it will appear when the easily removable coating film is applied to it.

13. The information processing method according to claim 12, wherein the computer has a first database that stores information on the body color and information on at least one of the vehicle model, the size class, the body type, the motor type, and the price in a linked manner for each of the vehicles in stock, wherein the computer executes the processing of:

receiving the specification of a first condition including at least one of the vehicle model, the size class, the body type, the motor type, and the price of the first vehicle in addition to the specification of the first body color;

determining whether the first vehicle is in stock based on the first body color, the first condition, and the information in the first database; and when it is determined that the first vehicle is not in stock, determining the second vehicle based on the first condition and the information in the first database.

14. The information processing method according to claim 13, wherein the first database stores information on the hue of the body color in addition to the information on the body color and the information on at least one of the vehicle model, the size class, the body type, the motor type, and the price in a linked manner for each of the vehicles in stock, and when it is determined that there is not a vehicle in stock that matches the first body color and the first condition, the computer executes the processing of:

determining whether there is a vehicle in stock that matches the hue of the first body color and the first condition based on the information in the first database;

when it is determined that there is a vehicle in stock that matches the hue of the first body color and the first condition, determining that the first vehicle is in stock; and when it is determined that there is not a vehicle in stock that matches the hue of the first body color and the first condition, determining that the first vehicle is not in stock.

15. The information processing method according to claim 13, wherein the first database further stores information on the proportions of respective body colors of vehicles in stock that have multiple body colors, and when it is determined that there is not a vehicle in stock that matches the first body color and the first condition, the computer executes the processing of:

determining whether there is a vehicle in stock of which the proportion of the first body color is larger than a specific threshold and that matches the first condition based on the information in the first database;

when it is determined that there is a vehicle in stock of which the proportion of the first body color is larger than a specific threshold and that matches the first condition, determining that the first vehicle is in stock; and when it is determined that there is not a vehicle in stock of which the proportion of the first body color is larger than a specific threshold and that matches the first condition, determining that the first vehicle is not in stock.

16. The information processing method according to claim 13, wherein the first database further stores information on the color of the original coating and the color of the easily removable coating film for vehicles in stock that have an easily removable coating film applied thereon, and when it is determined that there is not a vehicle in stock that matches the first body color and the first condition, the computer executes the processing of:
- determining whether there is a vehicle in stock of which the color of the original coating matches the first body color and that matches the first condition among the vehicles in stock that have an easily removable coating film applied thereon based on the information in the first database;
- when it is determined that there is a vehicle in stock of which the color of the original coating matches the first body color and that matches the first condition, determining that the first vehicle is in stock; and
- when it is determined that there is not a vehicle in stock of which the color of the original coating matches the first body color and that matches the first condition, determining that the first vehicle is not in stock.

17. The information processing method according to claim 16, wherein when it is determined that the first vehicle is in stock, the computer displays second information on the first web site, the second information including:
- information to suggest removing the easily removable coating film from the first vehicle information to suggest removing the easily removable coating film from the first vehicle,
- a virtual image of the first vehicle as it will appear when the easily removable coating film is removed from it, and
- information on a fee for removing the easily removable coating film from the first vehicle.

18. The information processing method according to claim 12, wherein the first information includes information on a condition of the second vehicle and a virtual image of the second vehicle as it will appear if an easily removable coating film is applied to it.

19. The information processing method according to claim 18, wherein the first information further includes information on a first fee for applying the easily removable coating film to the second vehicle.

20. The information processing method according to claim 19, wherein the second vehicle is a vehicle for lease, and the first information includes information on a monthly lease fee incorporating the first fee.

* * * * *